United States Patent [19]
Schwarz

[11] Patent Number: 5,713,763
[45] Date of Patent: Feb. 3, 1998

[54] CONNECTOR FOR SHIELDED CONDUCTORS AND CABLES

[75] Inventor: Ernst Schwarz, Hegnau-Volketswil, Switzerland

[73] Assignee: Pmaelectro AG, Switzerland

[21] Appl. No.: 633,539

[22] Filed: Apr. 17, 1996

[51] Int. Cl.$^6$ ............................................. H01R 13/648
[52] U.S. Cl. ............................................. 439/610
[58] Field of Search ............................ 439/607, 610, 439/609, 578–585

[56] References Cited

U.S. PATENT DOCUMENTS

| | | | |
|---|---|---|---|
| 3,197,730 | 7/1965 | Hargett | 439/610 |
| 4,073,559 | 2/1978 | Lawson, Jr. | 439/610 |
| 4,243,290 | 1/1981 | Williams | 439/610 |
| 4,854,891 | 8/1989 | Kamei et al. | 439/610 |
| 5,102,351 | 4/1992 | Meshel | 439/610 |
| 5,380,224 | 1/1995 | DiCicco | 439/610 |

FOREIGN PATENT DOCUMENTS 3-089476  4/1991  Japan ........................ 439/610

*Primary Examiner*—Hien Vu
*Attorney, Agent, or Firm*—Notaro & Michalos PC

[57] ABSTRACT

The connection device (1) serves for introducing a shielded cable (3) into a housing (2). The connection device (1) comprises a holding element (8) and a core part (7). The core part (7) is electrically conducting and connected with the housing (2). It is equipped at the inner end (13) with a fastening mechanism for the end (18) of the conducting sheath (6) of the cable (3). As holding element (8) can be present connection armourings for corrugated tubing (5), clamping screw connections for cables or other connection devices. In connection with the core part (7) they ensure the secure and simple connection of the shielded cable (3). The conducting sheath (6) of the cable (3) can be part of the cable or be guided loosely about the cable (3).

9 Claims, 2 Drawing Sheets

CONNECTOR FOR SHIELDED CONDUCTORS AND CABLES

FIELD AND BACKGROUND OF THE INVENTION

The invention relates to a connection device for shielded conductors and cables, wherein electrical conductors are encompassed by an electrically conducting sheath and are shielded against electromagnetic disturbances. A cable is introduced into the connection device and, the electrically conducting sheath is connected to the connection device and the connection device is provided with a throughlet for the cable and, via a core part, is connected by a flange to a housing.

Electrical conductors which must be protected from the outside against electromagnetic influences, that is, disturbances, are in known manner encompassed by an electrically conducting sheath, most frequently of a metal, which is connected to ground. This sheath forms, with one or several electrical conductors and most often with additional insulation material, a so-called shielded cable. Braided metal mesh, thin foils or other constructions with similar properties are used as sheathing. During the introduction into apparatus housings the ends of these shielded cables or their conducting sheath must be grounded which frequently takes place by connecting it with the housing into which the conductor is introduced. Such cable with corresponding grounding is known from EP-A2 0 96 932. Said invention deals with shielded cables, such as are used for example for the electrical systems in airplanes and other devices. These cables offer therein protection against electromagnetic disturbances, in particular overvoltages, for example as a consequence of lightning strikes. The described shielded cable is provided at the end with a connection device which serves for connecting the electrical conductors with an apparatus. For grounding the shielding sheath of the cable a clamping strap is disposed at the introduction into the connection device, which encompasses the metal sheath. This clamping strap is connected with screws to a grounding part, for example to the housing into which the conductor is inserted. Between the clamping strap and the housing the cable is guided without shielding through the connection device so that in this area an unprotected portion is formed since the shielding ends at the clamping strap before the connection device. This disadvantage occurs in particular in the case of connection devices comprising synthetic materials. Of disadvantage in this implementation is also the required additional clamping strap and the fastening of this clamping strap to a grounding part. This requires additional measures since with detachable plug or screw connections the clamping strap cannot be screwed to a grounding part but rather additional connection conductors are necessary.

From CH-A 612 801 connection devices for shielded cables are known which make possible the connection of the shielding sheath with a braided shielding mesh in a housing. In this solution a metal-clad cable is introduced into a housing with the metal-clad cable encompassing three wires which are each protected individually with an additional metal sheath. At the insertion site of the housing a connection device comprising metal is available which comprises a feed-through insert with a through-let opening for the cable wire as well as a flange for resting on the housing wall. The connection device is pressed against the housing wall by means of a screw connection and comprises on the outside a clamping ring. By means of this clamping ring the end of the metal sheath of each cable wire is clamped in and the clamping ring is connected by means of screws with the flange of the connection device. The implementation described here is intended for heavy metal-clad cables and can not readily be used for control lines and other lines with flexible conductors. The guidance through the housing wall is expensive and complicated and the metal sheath of the discrete wires cannot be inserted into the interior of the housing. For the entire metal sheath serving as protective tubing for the individual wires additional fastening means separate from the through-guidances are necessary and the described connection devices are not applicable for other cable types or end clamping assemblies.

SUMMARY OF THE INVENTION

It is the task of the invention to create a connection device for shielded conductors and cables which permits the use of synthetic materials for the parts of the connection device facing the cable, offers simultaneously a connection capabilities for various cable clamp elements and/or protective tubing and the electrically conducting partial sheath of the cable serving as shielding is readily yet securely clampable in the connection device and insertable into the interior of a housing, with the partial sheath serving as shielding usable as portion of the cable sheath as well as also as additional separate sheath, and which connection device permits also the complementation of existing non-shielded connection devices to form shielded connection devices.

This task is solved through the characteristics defined in the claims. Advantageous further developments of the invention are based on the characteristics of the dependent claims.

With the connection device according to the invention various advantages are achieved. A core part of the connection device is securely clamped through a screw connection with the wall through which the cable is to be introduced for example into a housing. This core part comprises a conducting material, for example aluminum, which establishes a conducting connection to the housing. The electrically conducting sheath which protects the conductors or the cable against electromagnetic disturbances is guided through the through-let of the connection device and of the core part and fastened at the inner end to the core part. The end of the electrically conducting sheath is for this purpose folded over the entire circumference over a collar at the inner end of the core part and clamped tightly with the aid of a ring nut. This creates the largest possible conducting connection between the electrically conducting sheath and the core part which ensures simultaneously the certain and strong clamping of the electrically conducting sheath. Dividing the connection device into a core part and a holding element connected with one another with a threaded connector offers the advantage that at the end of the connection device facing away from the housing different holding elements comprising synthetic material can be disposed. Known connection armourings can therein be used, such as for example those known from DE-C 29 08 337 for flexible corrugated tubing. In this implementation the conductors or the cable are carried loosely and protested in the corrugated tubing and guided via the connection armouring for example into a housing. The electrically conducting protective sheath is therein a component part of the cable sheath or is carried in addition to the conductors or the cable, respectively. If the connection device according to the invention is combined with flexible corrugated tubing it is possible to introduce the electrically conducting sheath independently of the cable or the conductors, and to connect it with the connection device.

Therewith the possibility is given of producing cable tubings and installations for conductor connections with the complete shieldings before the conductors are pulled in. But it is also possible to encompass existing non-shielded lines additionally with an electrically conducting sheath and to pull this electrically conducting sheath into the corrugated tubing and into the connection device according to the invention. Since the electrically conducting sheath is carried completely through the through-let in the connection device and is only connected with it in the interior of the housing, no gap in the shielding results. This is the case with installations equipped from the outset with shieldings as well as also with those connections subsequently equipped with electrically conducting sheaths.

Already existing non-shielded connection devices can be converted to shielded connection devices according to the invention thereby that an additional core part according to the invention is installed. This core part comprises an extended sheath part, and the outer diameter of the threaded connector in the transition to the holding element is equal in size to the diameter of the portion of the core part penetrating through the housing. In this way the core part can be introduced into the same opening which is already available for the non-shielded original connection device without reconstructing the aperture of the housing. At the same time the originally present non-shielded connection device can continue to be used by screwing it into the core part. However, this is only possible if it is suitable for carrying through a shielded conductor or cable, otherwise it must be replaced with an appropriate known holding element.

If the inner diameter of the tension nut with which the flange of the core part is clamped against the housing is greater than the outer diameter of the ring nut with which the end of the electrically conducting sheath is secured, a further advantage is attained. This consists therein that the connection between connection device and electrically conducting sheath can be established outside of the housing. The inner end of the core part on the connection device is subsequently placed into the opening on the housing and it is subsequently only necessary to push the tension nut from the inside over the ring nut and to screw it onto the core part. This reduces to a minimum the manipulations required in the interior of the housing and the connection of corresponding shielding sheaths is possible in shorter time and simpler manner.

BRIEF DESCRIPTION OF THE DRAWINGS

In the following the invention will be explained in further detail in conjunction with embodiment examples with reference to the enclosed drawings. Therein depict.

DESCRIPTION OF THE PREFERRED EMBODIMENT

Figure 1:
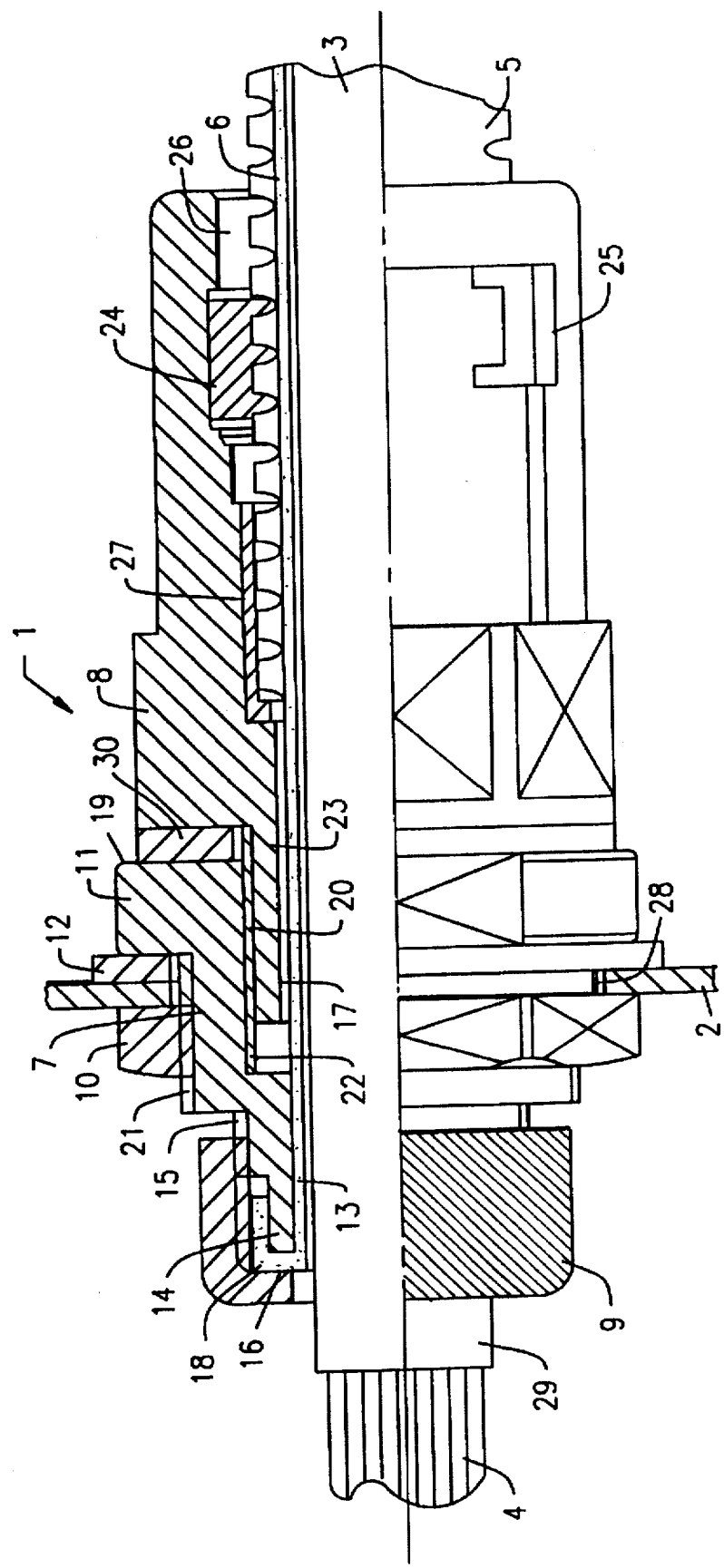
FIG. 1 A connection device according to the invention in partial longitudinal section with a holding element for a corrugated tubing, and FIG. 2 a connection device with identical thread diameters on the core part and holding element.

In FIG. 1 is shown a segment of a wall 2 of a housing with a connection device 1 being fastened on this wall 2. The connection device 1 comprises a holding element 8, a core part 7, a tension nut 10 and a ring nut 9. In the connection device 1 a through-let 17 is provided which extends in the form of a bore through the entire device. This through-let 17 serves for receiving a cable 3 which in the example shown comprises a bundle of electrical conductors 4, an insulating sheath 29 and an electrically conducting sheath 6. The electrically conducting sheath 6 in the example shown is not connected with the insulating sheath 29 but rather is disposed loosely about it. In known manner the electrically conducting sheath 6 could be molded between the conductors 4 and the insulating sheath 29 or an additional sheath. For the connection with the connection device 1 it would need to be stripped of insulation. The electrically conducting sheath 6 comprises a braided mesh of fine metal wires and serves for discharging electrical currents which can be generated as a consequence of magnetic fields or other effects. The conducting sheath 6 protects the conductors 4 or a corresponding cable against these disturbing effects. The core part 7 of the connection device 1 comprises an annular flange 11 and a threaded portion 21 adjoining it. Adjoining the threaded portion 21 is a further threaded stem 15 with a smaller diameter, and adjoining the inner end 13 of the core part 7 is disposed an annular collar 14. The threaded portion 21 is placed through a bore 28 into the housing wall 2 and clamped by means of a tension nut 10 against the housing wall 2. Between the flange 11 of the core part 7 and the housing wall 2 is placed a seal 12. This arrangement permits sealing the connection device 1 at the outside of the housing wall 2 which ensures a high degree of tightness. In the region of flange 11 of core part 7 a threaded bore 22 is available which is a component of a threaded connector 20. This threaded connector 20 serves for connecting the core part 7 with the holding element 8 which to this end comprises a threaded stem 23. This holding element 8 comprises a connection armouring for flexible corrugated tubing and is a known implementation according to DE-C 29 08 337. This connection armouring comprises synthetic material and can therefore be produced in simple manner in a relatively complicated form and implemented for receiving flexible corrugated tubing 5. For this purpose the holding element or the connection armouring 8 comprises a guidance 26 into which a sealing cap 27 and the end of a flexible corrugated tubing 5 are slid. This corrugated tubing 5 encompasses the cable 3 and forms for it a guidance and a protective sheath. The fastening of the corrugated tubing 5 on the holding element 8 or the connection armouring takes place via a blocking element 24, such as is known from the cited patent. This blocking element 24 is inserted transversely to the longitudinal axis of the corrugated tubing 5 into a through-let 25 on the holding elment 8. For forming the connection device 1 the holding element 8 is screwed via the threaded stem 23 into the screw connection 20 or the threaded bore 22 on the core part 7 and clamped against it. Between flange 11 of the core part 7 and the holding element 8 is disposed a further seal 30 in order to ensure the tightness between these parts also.

The desired connection between the electrically conducting sheath 6 of cable 3 and the wall 2 of the housing takes place via the core part 7 which is formed of electrically conducting material, in the present example of aluminum. The end 18 of the conducting sheath 6 is folded over the collar 14 at the inner end 13 of the core part 7. This is relatively readily possible due to the braided structure of the conducting sheath 6, and specifically without additional working of end 18. Over the folded end 18 of the conducting sheath 6 the ring nut 9 is slipped, with one clamping face 16 facing toward the collar 14 at the core part 7 and clamping the end 18 of the conducting sheath 6 securely. For this purpose the ring nut 9 engages the threads 15 on the core part 7 and can be clamped tightly via the latter. The tension nut 10 is built of steel or aluminum and, consequently, is also electrically conducting. Potential electrical currents which flow over the conducting sheath 6 can thus flow off via the collar 14 into the core part 7 and from there via the tension nut 10 into the wall 2 of the housing.

The type of embodiment shown permits establishing the connection between the conducting sheath 6 and the core part 7 via the ring nut 9 before the connection device 1 is connected with the housing wall 2. For this purpose the diameter of the threaded portion 21 on the core part 7 is greater than the outer diameter of the ring nut 9. Consequently the inner diameter of bore 28 is also greater than the ring nut 9, and the connection device 1 connected with the conducting sheath 6 can be introduced without difficulties through bore 28 into the housing wall 2. In the interior of the housing subsequently only the tension nut 10 needs to be screwed on and no difficult manipulations on the conducting sheath within the housing are necessary.

As is shown in FIG. 1, the conducting sheath 6 can be disposed independently of the conductor bundle 4 and the associated insulating sheath 29. This permits creating shielded lines into which subsequently conductor 4 or entire cables 3 can be pulled. The conducting sheath 6 can be introduced without difficulties into the corrugated tubing 5 as well as also into the connection device connected with the corrugated tubing 5 and can be fastened there. But it is also possible in the case of already placed electrical conductors 4 to pull on additionally a conducting sheath 6 and thereby to shield it. The existing non-shielded connection devices are replaced with connection devices 1 according to the invention whereby also the conversion to a shielded system is subsequently possible.

Figure 2:
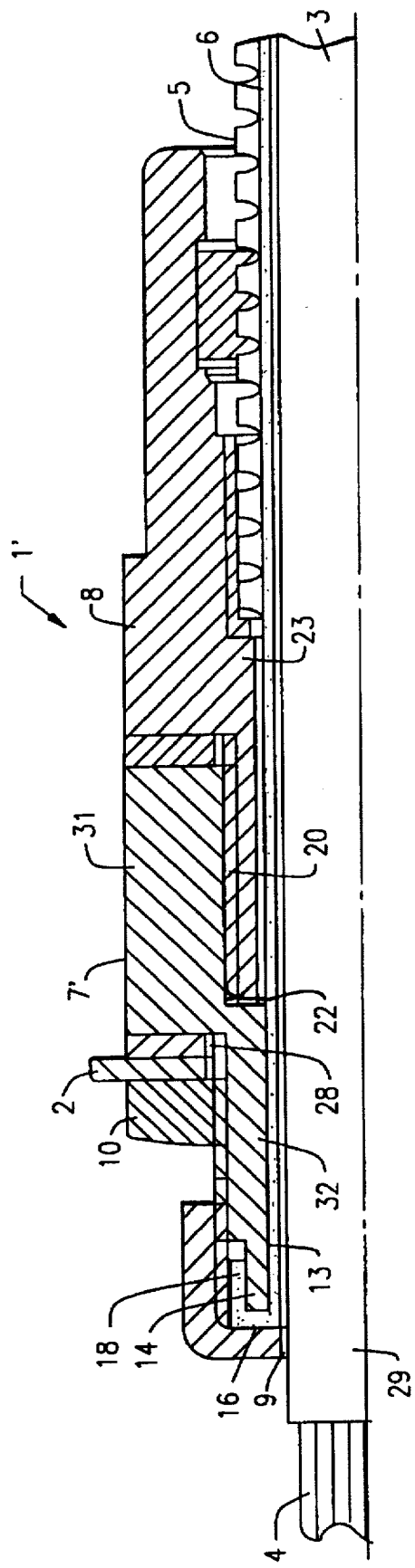

FIG. 2 shows in principle the same constructional parts of a connection device 1' as had been described in connection with FIG. 1. However, the core part 7' is therein implemented so that it is suitable specifically for the conversion of non-shielded connection devices. The core part 7' comprises an extended sheath part 31 in which the threaded bore 22 of the threaded connector 20 for the holding element 8 is disposed. Before the conversion the threaded stem 23 was placed directly into the bore 28 in the housing wall and clamped to it via the tension nut 10. Therein the conductor bundle 4 with the insulating sheath 29 was introduced directly and without shielding into the housing. The core part 7' shown in FIG. 2 comprises a threaded stem 32 which is directed toward the interior of the housing and has the same outer diameter as the threaded steam 23 on the holding element 8. Onto this threaded stem S2 the tension nut 10 is screwed and at the inner end 13 of core part 7' also the ring nut 9. At the inner end 13 of the core part 7' through a diameter reduction again a collar 14 is formed over which the end 18 of the conducting sheath 6 is folded. This end 18 is here also clamped tightly with the aid of the ring nut 9 and the clamping face 16 disposed thereon. This embodiment of the connection device 1 according to the invention permits the realization with a lesser diameter of the bore 28 in the housing wall 2 and serves in particular as replacement element for conversions of non-shielded connection devices. Instead of the connection armouring shown in FIG. 1 and 2 for a corrugated tubing 5 a known clamping screw connection or another screw connection can form the holding element 8 and be connected with the core part 7 or 7'. In the case of a clamping screw connection in known manner the insulating sheath of a cable 3 is directly clamped tightly and the cable thereby connected force-fittingly with the connection device 1. Such connections are useful wherever protective tubing for the cable and conductors is not required. With these embodiments the electrically conducting sheath 6 is normally embedded between two insulation layers of the insulating sheath 29 and must be stripped of insulation in known manner. The electrically conducting sheath from which the insulation has been removed can subsequently in simple manner, as described above, be connected with the core part 7 or 7' and thus a discharge of potential electrical currents into the housing wall 2 can be ensured.

The connection device 1 according to the invention ensures in each of the described embodiment examples a high connection certainty between the conducting sheath 6 and the housing wall 2 on which the connection device 1 is fastened. Nevertheless on the side facing the cable synthetic materials can be used which permits the use of known plastic armourings and potentially specific armourings having complicated forms. The sealing against the housing wall 2 moreover takes place at the outer end 19 of the core part 7 or 7', i.e. at the outside of the housing. Thereby a high degree of tightness is ensured. The connection device 1 according to the invention comprises significantly further application capabilities and use options than the known armourings which can be used for shielded conductors and cables.

I claim:

1. Connection device (1) for shielded conductors and cables extending through a housing wall (2), wherein electrical conductors (4) are encompassed by an electrically conducting sheath (6) and shielded against electromagnetic disturbances and form a cable (3), the cable (3) extending through the connection device (1), the electrically conducting sheath (6) being connected to the connection device (1) and the connection device (1) being provided with a through-let (17) for the cable (3) and via a core part (7) is connected by a flange (11) to the housing wall (2), characterized in that the core part (7) comprises an electrically conducting material, the electrically conducting sheath (6) extends through the through-let (17) of the connection device (1) and the entire core part (7), at an inner end (13) of the core part (7) on an interior side of the housing wall (2) about the through-let (17), has a collar (14), an end (18) of the electrically conducting sheath (6) being foldable over the collar (14), a ring nut (9) screwed onto the inner end (13) of the core part (7) and on the face of the ring nut (9) facing the collar (14) a clamping face (16) for the electrically conducting sheath (6) being formed, the core part (7) having an outer end (19) on an outside of the wall (2) with a threaded connector (20), a holding element (8) comprising synthetic material for holding the cable (3) being connected to the core part (7) by the threaded connector (20).

2. Connection device as stated in patent claim 1, characterized in that the holding element (8) is a connection armouring for a corrugated tubing (5) over the cable(3).

3. Connection device as stated in patent claim 1, characterized in that the holding element (8) is a clamping screw for clamping tightly the cable (3).

4. Connection device as stated in claim 1, characterized in that the core part (7) comprises at the outer end (19) an extended sheath part (31), and the outer diameter of the threaded connector (20) on the holding element (8) is of the same size as the diameter at a portion (32) of the core part (7) penetrating the housing wall.

5. Connection device as stated in claim 1, characterized in that the flange (11) of the core part (7) is in contact with the outside of the housing wall (2), a threaded portion (21) projects into the housing wall (2) and bears a tension nut (10) with the inner diameter of the tension nut (10) being greater than the outer diameter of the ring nut (9).

6. A connection device for shielded conductors and cables extending between an interior and an exterior of a housing having a wall, comprising:

a conducting sheath, extending through an opening in the wall, the conducting sheath having an inner end on the interior of the housing, the conducting sheath being adapted to receive a cable having an insulating sheath containing a bundle of electrical conductors, the conducting sheath operating to shield against electromagnetic disturbances;

a core part extending around the conducting sheath and through the opening of the wall, the core part having a flange for holding the core part at a fixed location with respect to the wall, the core part being made of electrically conducting material and having an inner end on the interior of the housing;

the inner end of the core part including a collar and the inner end of the conducting sheath being folded radially over an end of the collar;

a ring nut screwed to the inner end of the core part and having a face engaged against the portion of the sheath which is folded radially for holding the portion of the sheath which is folded radially against a radial end surface of the collar;

the core part having an outer end on the outside of the housing with a threaded inner surface; and a holding element made of synthetic non-electrically conductive material, threaded to the outer end of the core part and over the cable for holding the cable to the core part.

7. A connection device according to claim 6, including a corrugated tube over the cable and fixed between the holding element and the cable.

8. A connection device according to claim 6, wherein a diameter of a portion of the holding element which is threaded to the outer end of the core part, is the same as a diameter of a portion of the core part which extends through the opening in the wall, into the interior of the housing.

9. A connection device according to claim 6, including a tension nut threaded to an outer surface of the core part on the interior of the housing and against the wall for holding the core part to the wall between the tension nut and the flange, the tension nut having an outer diameter greater than an outer diameter of the ring nut.

* * * * *